US012572849B2

(12) United States Patent (10) Patent No.: US 12,572,849 B2
Earnshaw et al. (45) Date of Patent: Mar. 10, 2026

(54) IMAGE EMBEDDINGS VIA DEEP LEARNING AND ADAPTIVE BATCH NORMALIZATION

(71) Applicant: RECURSION PHARMACEUTICALS, INC., Salt Lake City, UT (US)

(72) Inventors: Berton Allen Earnshaw, Cedar Hills, UT (US); Maciej Sypetkowski, Warsaw (PL)

(73) Assignee: Recursion Pharmaceuticals, Inc., Salt Lake City, UT (US)

( * ) Notice: Subject to any disclaimer, the term of this patent is extended or adjusted under 35 U.S.C. 154(b) by 901 days.

(21) Appl. No.: 17/845,508

(22) Filed: Jun. 21, 2022

(65) Prior Publication Data

US 2023/0409960 A1 Dec. 21, 2023

(51) Int. Cl.
*G06N 20/00* (2019.01)

(52) U.S. Cl.
CPC .................................... *G06N 20/00* (2019.01)

(58) Field of Classification Search
CPC ...................................................... G06N 20/00
USPC ............................................................ 706/12
See application file for complete search history.

(56) References Cited

U.S. PATENT DOCUMENTS

| | | | | |
|---|---|---|---|---|
| 11,531,844 B2 * | 12/2022 | Bharti et al. | ........... | G06V 10/82 |
| 2021/0089960 A1 * | 3/2021 | Gupta | .................... | G06N 20/00 |
| 2021/0117729 A1 * | 4/2021 | Bharti et al. | ........... | G06V 10/82 |
| 2023/0245772 A1 * | 8/2023 | Fang et al. | ............ | G06T 7/0012 |
| | | | | 705/2 |

FOREIGN PATENT DOCUMENTS

| | | | | |
|---|---|---|---|---|
| CN | 109196527 A | * | 1/2019 | ............. G06N 3/047 |

OTHER PUBLICATIONS

International Search Report & Written Opinion as received in PCT/US23/68728 dated Oct. 6, 2023.
"1st Place Solution Write-up & Code", Posted in recursion-cellular-image-classification, 5 pages.
"Overview: Extracting and serving feature embeddings for machine learning", https://cloud.google.com/architecture/overview-extracting-and-serving-feature-embeddings-for-machine-learning, 17 pages.

* cited by examiner

*Primary Examiner* — April Y Blair
(74) *Attorney, Agent, or Firm* — Keller Preece PLLC

(57) ABSTRACT

One embodiment of the present invention sets forth a technique for training a machine learning model to generate image embeddings for images captured during multiple experiments. The technique includes inputting a batch of images into a plurality of layers in the machine learning model, wherein the batch of images has been sampled from a plurality of images generated via a first experiment. The technique also includes, for at least one layer included in the plurality of layers, computing a set of statistics associated with a plurality of outputs generated by the layer based on the batch of images and normalizing the plurality of outputs based on the statistics. The technique further includes updating a plurality of parameters for each of the plurality of layers based on a set of predictions generated by the first machine learning model from the batch of images and the normalized plurality of outputs.

20 Claims, 6 Drawing Sheets

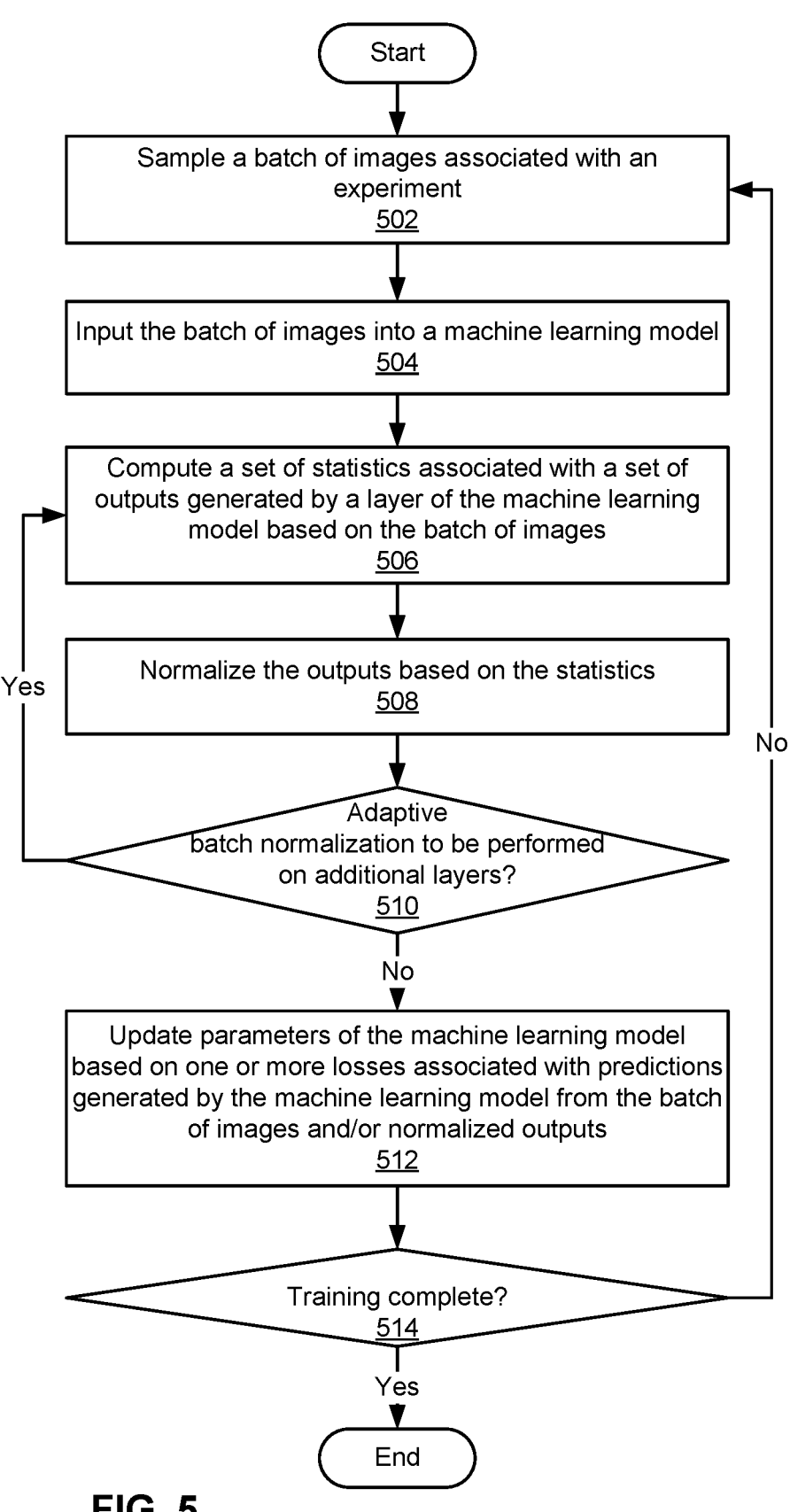

Start

Sample a batch of images associated with an
experiment
502

Input the batch of images into a machine learning model
504

Compute a set of statistics associated with a set of
outputs generated by a layer of the machine learning
model based on the batch of images
506

Normalize the outputs based on the statistics
508

Adaptive
batch normalization to be performed
on additional layers?
510

Yes

No

No

Update parameters of the machine learning model
based on one or more losses associated with predictions
generated by the machine learning model from the batch
of images and/or normalized outputs
512

Training complete?
514

Yes

End

FIG. 5

IMAGE EMBEDDINGS VIA DEEP LEARNING AND ADAPTIVE BATCH NORMALIZATION

BACKGROUND

Field of the Various Embodiments

Embodiments of the present disclosure relate generally to computer science and machine learning and, more specifically, to techniques for generating image embeddings via deep learning and adaptive batch normalization.

Description of the Related Art

Image embeddings are compact mathematical representations of semantic or visual attributes of various images. Image embeddings are commonly generated by neural networks that have been trained to perform tasks related to those images. For example, an image could be inputted into a neural network that has been trained to categorize objects depicted in a set of training images. The neural network could include a series of layers that transform pixel values in the input image into a prediction of a type of object depicted in the input image. An embedding of the input image could be represented as a vector of numbers outputted by a "hidden" layer between the input layer and the output layer of the neural network. The embedding could include a vector of numbers that is substantially smaller than the input image (e.g., 50-100 vector elements in the embedding versus hundreds of thousands to millions of pixel values in the input image).

Image embeddings produced by a given neural network can be used to characterize and compare the images corresponding to the image embeddings. For example, a neural network that is trained to categorize different types of objects in images would produce embeddings that represent distinguishing visual attributes of each type of object. Thus, images that include the same types of objects would have similar visual attributes and, accordingly, embeddings that are closer to one another in a multidimensional vector space. Similarly, images that include different types of objects would have dissimilar visual attributes and, accordingly, embeddings that are farther apart from one another in the multidimensional vector space. Measures of distance between embeddings of images could be used, for example, to search for or retrieve images that are similar to a given image, divide a large set of images into clusters of related or similar images, identify attributes that are shared by images within a given cluster, detect trends or patterns related to the content of the images based on changes to the clusters over time, and/or detect anomalous "outlier" images with embeddings that lie outside the clusters.

One drawback of conventional approaches for generating image embeddings is that conventional approaches do not account for batch effects that cause different "batches" of images to vary in appearance. These batch-level differences in appearance can cause interference or "noise" when generating image embeddings that are being used to characterize objects or other content within images. For example, an experiment could be conducted multiple times to generate images of cells that have been perturbed (e.g., subject to different treatments) in different ways. To generate image embeddings that characterize the various cell perturbations, a neural network could be trained to predict the perturbations applied to the cells based on the appearances of the cells in the images. However, each time the experiment is conducted, a different batch of images could be captured under a different set of conditions (e.g., by a different microscope, under different levels of humidity, under different concentrations of stain, etc.). The differing conditions result in batch effects that could cause images of cells that are perturbed in the same way to vary in appearance across different batches. While the neural network could be trained using a training dataset that includes multiple batches of images produced across multiple experiments, this training dataset likely would be unable to capture all possible combinations of the conditions that cause batch effects. Consequently, the trained neural network would be unable to remove the "noise" caused by the batch effects from image embeddings generated for subsequent batches of images that are not included in the training dataset.

As the foregoing illustrates, what is needed in the art are more effective techniques for generating image embeddings.

SUMMARY

One embodiment of the present invention sets forth a technique for training a machine learning model to generate image embeddings for images captured during multiple experiments. The technique includes inputting a batch of images into a plurality of layers in the machine learning model, wherein the batch of images has been sampled from a plurality of images generated via a first experiment. The technique also includes, for at least one layer included in the plurality of layers, computing a set of statistics associated with a plurality of outputs generated by the layer based on the batch of images and normalizing the plurality of outputs based on the set of statistics. The technique further includes updating a plurality of parameters for each of the plurality of layers based on a set of predictions generated by the first machine learning model from the batch of images and the normalized plurality of outputs.

At least one technical advantage of the disclosed techniques relative to the prior art is that, with the disclosed techniques, image embeddings exhibit less noise resulting from batch effects. Accordingly, image embeddings generated using the disclosed techniques more accurately represent distinguishing visual attributes of objects or other content within images relative to image embeddings generated using conventional approaches that do not normalize for batch effects in image embeddings. These technical advantages provide one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

FIG. 5 sets forth a flow diagram of method steps for training a machine learning model to generate image embeddings for images captured across multiple experiments, according to various embodiments.

DETAILED DESCRIPTION

In the following description, numerous specific details are set forth to provide a more thorough understanding of the various embodiments. However, it will be apparent to one of skill in the art that the inventive concepts may be practiced without one or more of these specific details.

System Overview

Figure 1:
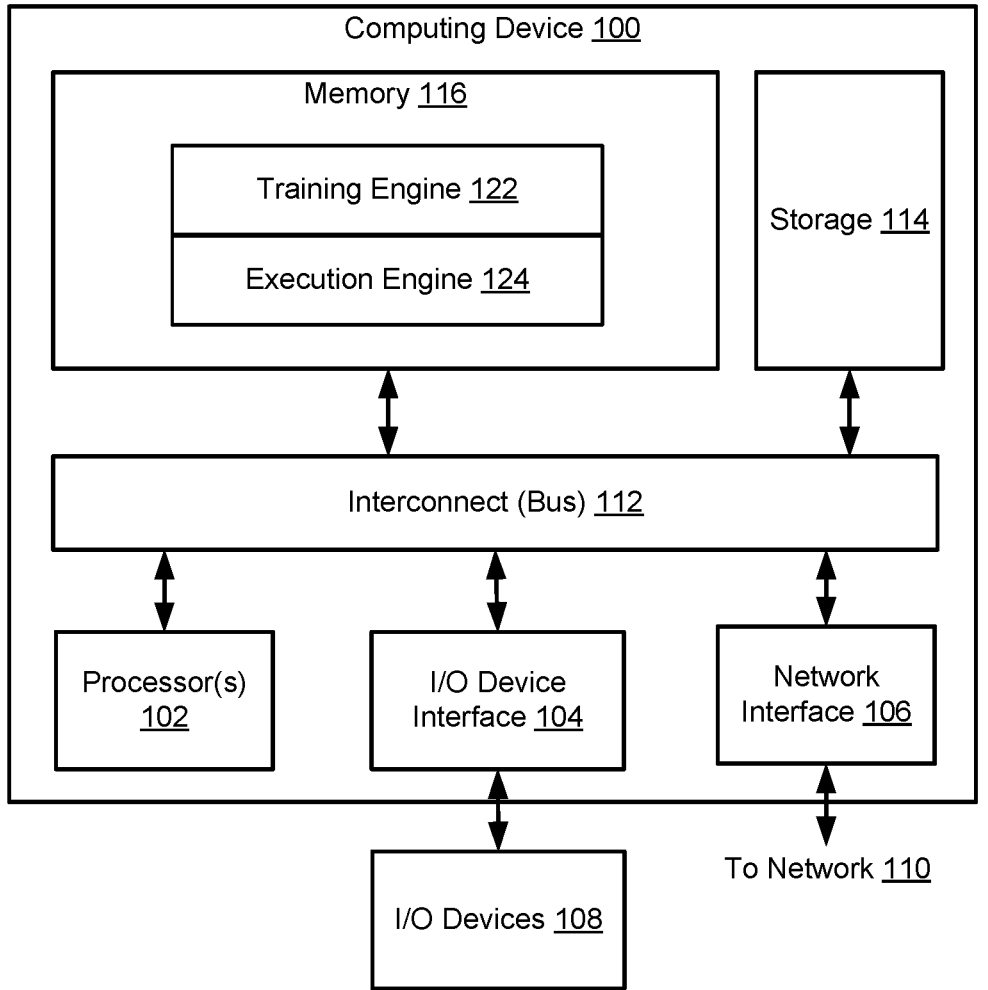
FIG. 1 illustrates a computing device configured to implement one or more aspects of various embodiments.

FIG. 1 illustrates a computing device 100 configured to implement one or more aspects of various embodiments. In one embodiment, computing device 100 includes a desktop computer, a laptop computer, a smart phone, a personal digital assistant (PDA), tablet computer, or any other type of computing device configured to receive input, process data, and optionally display images, and is suitable for practicing one or more embodiments. Computing device 100 is configured to run a training engine 122 and execution engine 124 that reside in a memory 116.

It is noted that the computing device described herein is illustrative and that any other technically feasible configurations fall within the scope of the present disclosure. For example, multiple instances of training engine 122 and execution engine 124 could execute on a set of nodes in a distributed and/or cloud computing system to implement the functionality of computing device 100. In another example, training engine 122 and/or execution engine 124 could execute on various sets of hardware, types of devices, or environments to adapt training engine 122 and/or execution engine 124 to different use cases or applications.

In one embodiment, computing device 100 includes, without limitation, an interconnect (bus) 112 that connects one or more processors 102, an input/output (I/O) device interface 104 coupled to one or more input/output (I/O) devices 108, memory 116, a storage 114, and a network interface 106. Processor(s) 102 may be any suitable processor implemented as a central processing unit (CPU), a graphics processing unit (GPU), an application-specific integrated circuit (ASIC), a field programmable gate array (FPGA), an artificial intelligence (AI) accelerator, any other type of processing unit, or a combination of different processing units, such as a CPU configured to operate in conjunction with a GPU. In general, processor(s) 102 may be any technically feasible hardware unit capable of processing data and/or executing software applications. Further, in the context of this disclosure, the computing elements shown in computing device 100 may correspond to a physical computing system (e.g., a system in a data center) or may be a virtual computing instance executing within a computing cloud.

In one embodiment, I/O devices 108 include devices capable of receiving input, such as a keyboard, a mouse, a touchpad, and/or a microphone, as well as devices capable of providing output, such as a display device and/or speaker. Additionally, I/O devices 108 may include devices capable of both receiving input and providing output, such as a touchscreen, a universal serial bus (USB) port, and so forth. I/O devices 108 may be configured to receive various types of input from an end-user (e.g., a designer) of computing device 100, and to also provide various types of output to the end-user of computing device 100, such as displayed digital images or digital videos or text. In some embodiments, one or more of I/O devices 108 are configured to couple computing device 100 to a network 110.

In one embodiment, network 110 is any technically feasible type of communications network that allows data to be exchanged between computing device 100 and external entities or devices, such as a web server or another networked computing device. For example, network 110 could include a wide area network (WAN), a local area network (LAN), a wireless (WiFi) network, and/or the Internet, among others. Network 110 could connect multiple instances of computing device 100 (e.g., within a data center, cluster, cloud computing environment, etc.) to allow training engine 122 and execution engine 124 to operate in a parallel, distributed, and/or scalable fashion.

In one embodiment, storage 114 includes non-volatile storage for applications and data, and may include fixed or removable disk drives, flash memory devices, and CD-ROM, DVD-ROM, Blu-Ray, HD-DVD, or other magnetic, optical, or solid-state storage devices. Training engine 122 and execution engine 124 may be stored in storage 114 and loaded into memory 116 when executed.

In one embodiment, memory 116 includes a random access memory (RAM) module, a flash memory unit, or any other type of memory unit or combination thereof. Processor(s) 102, I/O device interface 104, and network interface 106 are configured to read data from and write data to memory 116. Memory 116 includes various software programs that can be executed by processor(s) 102 and application data associated with said software programs, including training engine 122 and execution engine 124.

Training engine 122 trains a machine learning model to perform processing related to images, and execution engine 124 executes one or more portions of the machine learning model to generate embeddings of images. For example, training engine 122 could train a convolutional neural network and/or another type of deep learning model to predict classes associated with cells and/or other types of objects depicted in a training dataset of images. Execution engine 124 could apply the trained deep learning model to additional images and obtain embeddings of the additional images from one or more hidden layers of the trained deep learning model.

In one or more embodiments, training engine 122 and execution engine 124 use adaptive batch normalization to train and execute the machine learning model. More specifically, training engine 122 and execution engine 124 normalize outputs of various layers of the machine learning model based on statistics computed from batches of images that are captured under different sets of conditions. For example, input into the machine learning model could include multiple batches of images of cells, where each batch is captured from a different plate of cells and/or during a different run of an experiment that applies a predefined set of perturbations to the cells. Cells in the images would differ in appearance due to different perturbations of the cells (e.g., different medical or biological treatments applied to cells) and due to the varying conditions under which different batches of images are captured. To correct for differences in cell appearance across batches, the machine learning model could include an adaptive batch normalization layer after one or more convolutional layers, fully connected layers, and/or other neural network layers composed of neurons. The adaptive batch normalization layer could compute the mean and standard deviation of a set of output values generated by a neuron in a corresponding neural network layer from a given batch of images. The adaptive batch normalization layer could also standardize the set of output values using the computed mean and standard deviation, so that the set of output values is centered at 0 and has a standard deviation of 1.

As described in further detail below, the adaptive batch normalization performed by training engine 122 and execution engine 124 reduces distributional differences in the outputs generated by a given neural network layer from multiple batches of images. Consequently, embeddings that are produced using adaptive batch normalization are better at capturing visual attributes that characterize classes associated with objects in the images than image embeddings generated using conventional approaches that do not account for batch effects.

Image Embeddings Via Deep Learning and Adaptive Batch Normalization

Figure 2:
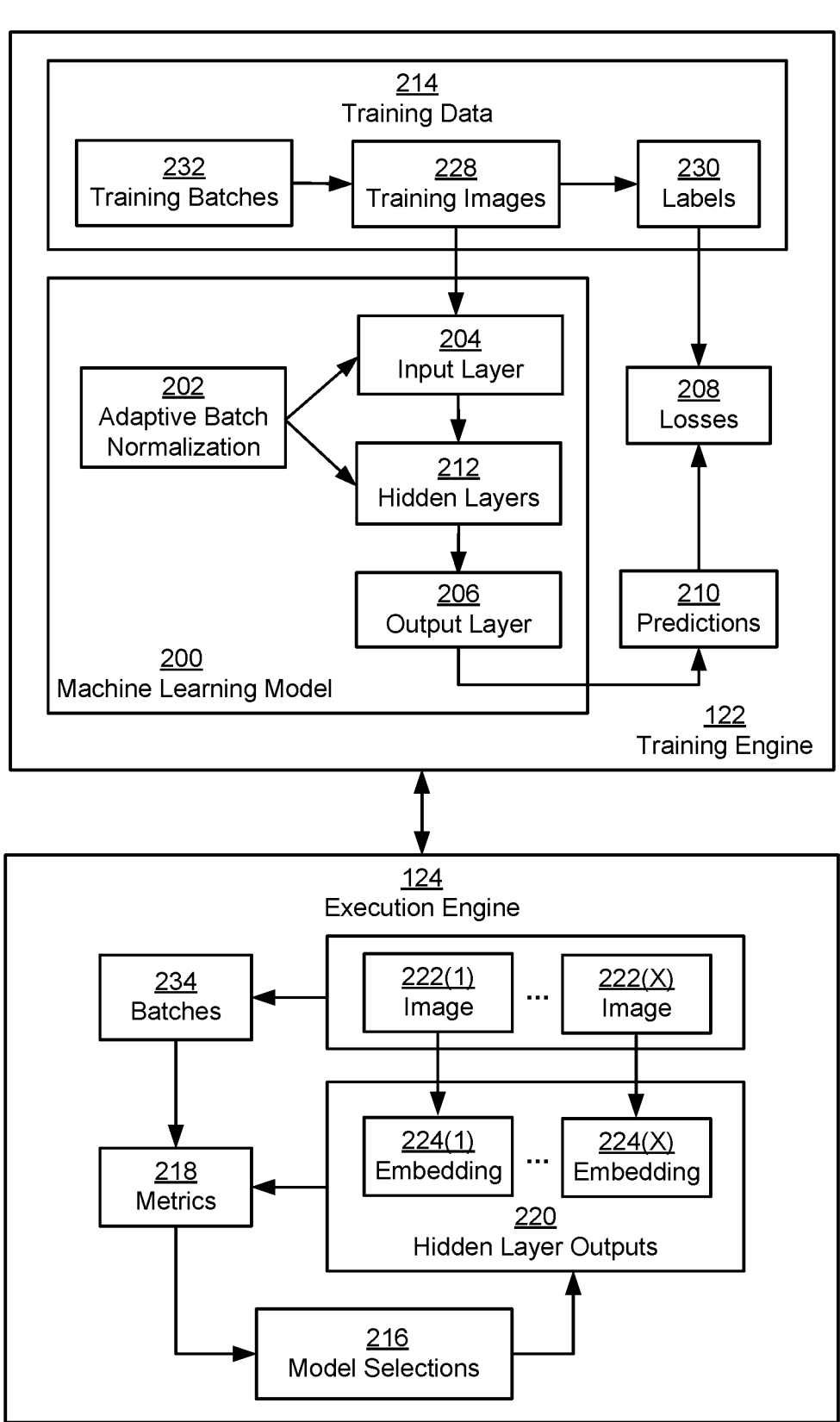
FIG. 2 is a more detailed illustration of the training engine and execution engine of FIG. 1, according to various embodiments.

FIG. 2 is a more detailed illustration of training engine 122 and execution engine 124 of FIG. 1, according to various embodiments. As mentioned above, training engine 122 trains a machine learning model 200 to perform a task using training data 214 that includes training images 228 and labels 230 associated with training images 228. For example, training engine 122 could train a convolutional neural network and/or another type of deep learning model to generate predictions 210 of cell types, treatments, and/or other classes represented by labels 230 in training data 214.

As shown in FIG. 2, machine learning model 200 includes an input layer 204, one or more hidden layers 212, and an output layer 206. Input layer 204 receives image data (e.g., pixel values) from an input image and uses a set of neurons to convert the image data into an initial set of output values. The initial set of output values is inputted into a series of hidden layers 212 that generate additional sets of output values associated with the image data. More specifically, the initial set of output values generated by input layer 204 is inputted into the first hidden layer, and the output of a given hidden layer is provided as input into the next hidden layer. A set of output values generated by the last hidden layer is provided as input into output layer 206. This set of output values is converted by output layer 206 into a set of predictions 210 related to the input image.

For example, input layer 204 and hidden layers 212 could include one or more convolutional layers and/or fully connected layers. Each convolutional layer and fully connected layer could apply one or more nonlinear transformations to a set of input values (e.g., the output of the previous layer) to generate a corresponding set of output values. Output layer 206 could include a softmax layer that converts the output of the last hidden layer into predictions 210 that include probabilities of various classes represented by labels 230 in training data 214.

During training of machine learning model 200, training engine 122 updates parameters of machine learning model 200 based on one or more losses 208 computed between predictions 210 generated by machine learning model 200 from training images 228 and the corresponding labels 230. Continuing with the above example, training engine 122 could compute a cross-entropy loss between probabilities of classes outputted by the softmax layer from one or more training batches 232 of training images 228 and the corresponding labels 230. Training engine 122 could then use a training technique (e.g., gradient descent and backpropagation) to iteratively update weights and/or biases associated with input layer 204, hidden layers 212, and output layer 206 in a way that reduces the cross-entropy loss.

After machine learning model 200 is trained, execution engine 124 uses machine learning model 200 to generate embeddings 224(1)-224(X) (each of which is referred to individually as embedding 224) of additional images 222 (1)-222(X) (each of which is referred to individually as image 222). For example, execution engine 124 could use one or more hidden layers 212 of the trained machine learning model 200 to generate a set of hidden layer outputs 220 for each image 222 inputted into the trained machine learning model 200. Execution engine 124 could then convert each set of hidden layer outputs 220 into an embedding 224 for the corresponding image 222 (e.g., by storing hidden layer outputs 220 in a vector corresponding to embedding 224).

As mentioned above, batch effects can cause training images 228 in different training batches 232 and images 222 in different batches 234 to differ in appearance. These batch-based differences in appearance can interfere with the ability of embeddings 224 to characterize visual attributes that can be used to predict classes associated with images 222. For example, an experiment could be conducted multiple times to generate images 222 of cells that have been perturbed (e.g., subject to different genetic treatments) in different ways. Labels 230 and/or classes associated with images 222 would correspond to different perturbations of the cells depicted in the images. Each time the experiment is conducted, a different batch of images 222 could be captured under a different set of conditions (e.g., by a different microscope, under different levels of humidity, under different concentrations of stain, etc.). These conditions would cause images 222 to exhibit experimental noise that is unrelated to the perturbation of the cells. Consequently, embeddings 224 generated by machine learning model 200 from images 222 could fail to capture attributes that can be used to distinguish between different perturbations of the cells, particularly when batch effects associated with batches 234 of images 222 differ from batch effects associated with training batches 232 of training images 228 used to train machine learning model 200.

Figure 3:
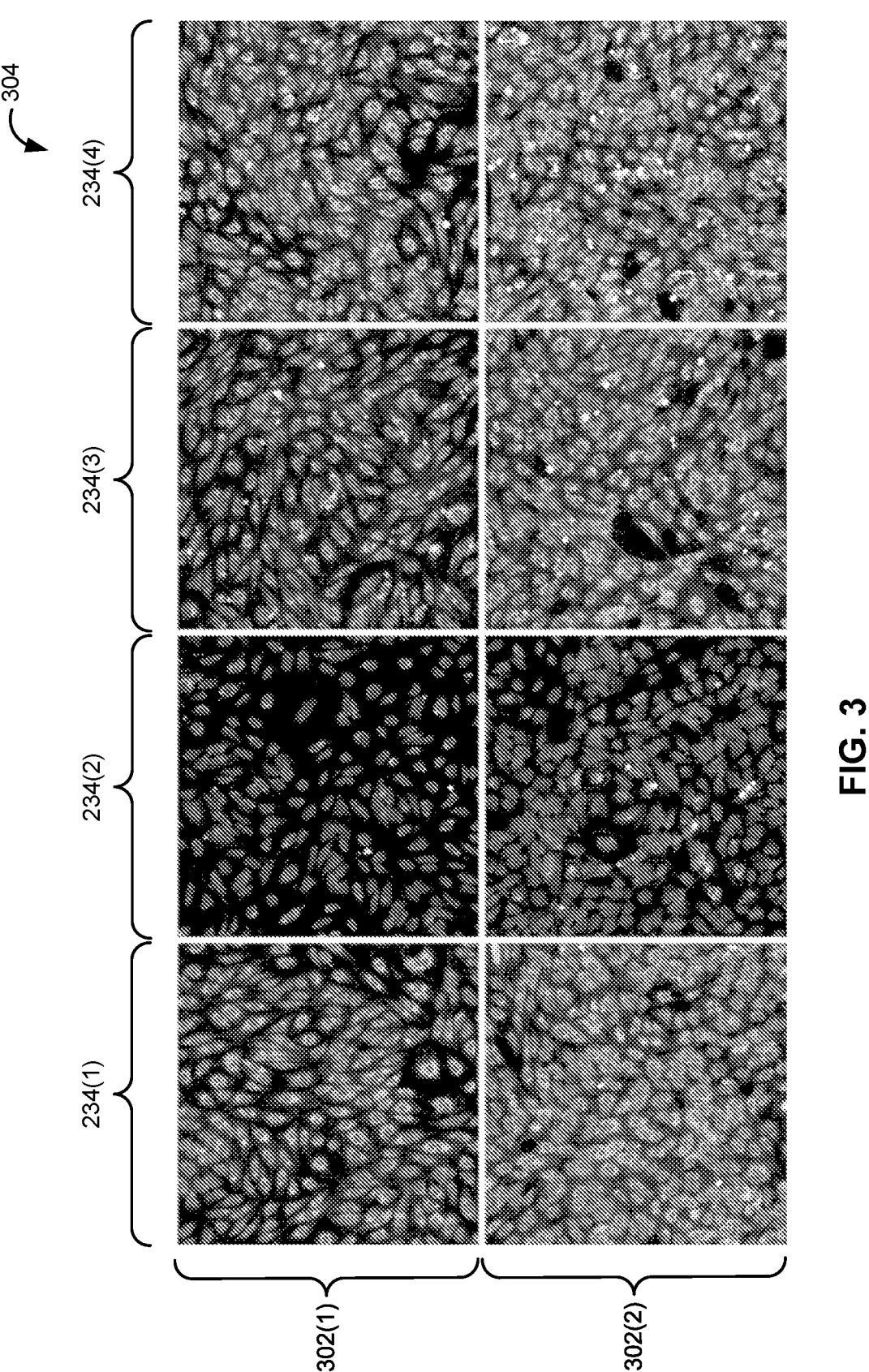
FIG. 3 illustrates an exemplar set of images that can be inputted into the machine learning model of FIG. 2, according to various embodiments.

FIG. 3 illustrates an exemplar set of images 304 that can be inputted into machine learning model 200 of FIG. 2, according to various embodiments. More specifically, FIG. 3 illustrates a set of eight images 304 of the same type of cell. Images 304 can be included in training data 214 for machine learning model 200. Images 304 can also, or instead, be included in additional images 222 for which a trained machine learning model 200 is used to generate embeddings 224.

As shown in FIG. 3, four columns of images 304 correspond to four different batches 234(1)-234(4). Each batch 234 of images 304 can be produced under a different set of conditions. For example, batches 234(1)-234(4) could be produced using different microscopes, concentrations of stain, humidity levels, temperatures, and/or other factors that affect the appearances of cells in images 304.

Further, two rows of images 304 correspond to two different treatments 302(1)-302(2) of cells depicted in images 304. For example, treatment 302(1) could include genetically perturbing the cells using a first type of short-interfering ribonucleic acid (siRNA), and treatment 302(2) could include genetically perturbing the cells using a second type of siRNA.

As mentioned above, cells subject to different treatments 302(1)-302(2) can differ in appearance within images 304. For example, images 304 in different rows could capture differences in the sizes, shapes, densities, and/or other characteristics of cells that have been genetically perturbed using two different types of siRNA. However, cells subject to the same treatment in different batches 234(1)-234(4) can also differ in appearance. For example, differences in the conditions under which different batches 234(1)-234(4) of images 304 were captured could cause images 304 in the same row and different columns to vary in color, cell density, cell size, cell shape, and/or other visual attributes. These batch-based differences in visual attributes correspond to experimental noise that can interfere with the generation of embeddings 224 that characterize visual attributes associated with different treatments 302(1)-302(2).

Returning to the discussion of FIG. 2, training engine 122 uses adaptive batch normalization 202 with input layer 204 and/or hidden layers 212 of machine learning model 200 to account for batch effects associated with training batches 232 of training images 228 in training data 214. More specifically, training engine 122 generates training batches 232 of training images 228 by sampling each training batch from a single experiment and/or from a single plate of cells within an experiment. Consequently, training engine 122 ensures that training images 228 within a given training batch are captured under the same set of conditions.

Next, training engine 122 separately inputs each training batch into machine learning model 200 and performs batch normalization of the corresponding outputs of input layer 204 and/or one or more hidden layers 212. For example, training engine 122 could input a training batch of N training images 228 (where N is a positive integer greater than 1) into input layer 204 and receive N output values from each neuron in input layer 204. Training engine 122 could compute a mean and standard deviation from the N output values. Training engine 122 could subtract the mean from each of the N output values and divide the result by the standard deviation, so that the N output values are normalized into a distribution with a mean of 0 and a standard deviation of 1. Training engine 122 could repeat the process with each of hidden layers 212 in machine learning model 200. In particular, training engine 122 could normalize N output values generated by each neuron in a given layer for the N images and subsequently input the normalized output values into the next layer of machine learning model 200. Training engine 122 could also, or instead, omit adaptive batch normalization 202 of outputs from certain layers (e.g., input layer 204 and/or one or more hidden layers 212). In other words, training engine 122 could apply adaptive batch normalization 202 to some or all neural network layers prior to output layer 206 in machine learning model 200.

After training of machine learning model 200 is complete, execution engine 124 continues to use adaptive batch normalization 202 in the trained machine learning model 200 to generate embeddings 224 of images 222. In one or more embodiments, execution engine 124 generates batches 234 of images 222 in the same way that training engine 122 generates training batches 232 of training images 228. That is, each batch of images 222 is sampled from the same experiment and/or plate of cells and is therefore captured under the same set of conditions.

Next, execution engine 124 separately inputs each batch of images 222 into machine learning model 200 and uses adaptive batch normalization 202 to normalize the outputs of input layer 204 and/or one or more hidden layers 212. For example, execution engine 124 could input a batch of M images 222 (where M is a positive integer greater than 1) into input layer 204 and receive M sets of output values from each neuron in input layer 204. Execution engine 124 could compute a mean and standard deviation from the M output values. Execution engine 124 could subtract the mean from each of the M output values and divide the result by the standard deviation, so that the M output values are normalized into a distribution with a mean of 0 and a standard deviation of 1. Execution engine 124 could also, or instead, normalize M output values generated by each neuron in one or more hidden layers 212 from the batch of M images 222 and input the normalized values into one or more subsequent layers of machine learning model 200. Because embeddings 224 correspond to hidden layer outputs 220 from one or more hidden layers 212, embeddings 224 are also normalized for each batch of images 222. Consequently, embeddings 224 are able to emphasize visual attributes that distinguish between different classes of objects in images 222 (e.g., cells perturbed using different treatments) over experimental noise exhibited by different batches 234 of images 222.

As shown in FIG. 2, execution engine 124 also evaluates embeddings 224 by computing one or more metrics 218 associated with embeddings 224 and the corresponding batches 234. In some embodiments, metrics 218 include a perturbation consistency associated with different batches 234 of images 222. To compute the perturbation consistency, execution engine 124 constructs a first distribution of similarities (e.g., cosine similarities, Euclidean distances, and/or other measures of vector similarity) between pairs of embeddings of images 222 from the same class (e.g., pairs of images 222 of cells with the same perturbation) and different batches 234. Execution engine 124 also constructs a second distribution of similarities between pairs of embeddings of images 222 from different classes (e.g., pairs of images 222 of cells with different perturbations) and different batches 234. The first distribution includes "batch noise" caused by both stochastic differences and differences in conditions under which different batches 234 of images 222 are produced. The second distribution includes batch noise as well as "perturbation noise" associated with images 222 from different classes. Execution engine 124 computes a Kolmogorov-Smirnov (KS) statistic, a Wilcoxon rank-sum test statistic, and/or another test statistic related to a hypothesis test with a null hypothesis that the first distribution and the second distribution are equal. The test statistic thus corresponds to a metric that indicates how well embeddings 224 reduce batch noise and/or increase perturbation noise.

Metrics 218 also, or instead, include a hit detection metric that measures the extent to which embeddings 224 can be used to identify ground truth attributes associated with images 222. For example, execution engine 124 could compute the hit detection metric as an average precision of hit scores generated from embeddings 224 of images 222, given ground truth labels 230 for compounds that cause various diseases or compounds in cells depicted within images 222.

Metrics 218 also, or instead, include a perturbation detection metric that measures the extent to which states of objects in images 222 are detected, given embeddings 224 generated by machine learning model 200 from images 222 of the objects. For example, execution engine 124 could compute the perturbation detection metric as the number of phenoprints that can be detected from embeddings 224 of a set of images 222 of cells.

In one or more embodiments, execution engine 124 computes metrics 218 for multiple versions of machine learning model 200. For example, execution engine 124 could compute metrics 218 for versions of machine learning model 200 associated with different architectures, versions of machine learning model 200 that apply adaptive batch normalization 202 to different layers, and/or versions of machine learning model 200 that do not use adaptive batch normalization 202.

Execution engine 124 also uses metrics 218 to perform model selections 216 that choose a version of machine learning model 200 as an embedding model that is used to generate embeddings 224 of additional images 222 (e.g., in a production environment). For example, execution engine 124 could perform comparisons of metrics 218 across multiple versions of machine learning model 200 to identify a version of machine learning model 200 with the highest perturbation consistency, hit detection metric, and/or perturbation detection metric. Execution engine 124 could use the selected version of machine learning model 200 to generate embeddings 224 of a dataset of images 222, store embeddings 224 as compact representations of the corresponding images 222, provide embeddings 224 for use with downstream machine learning models, use embeddings 224 to characterize similarities and/or differences in the corresponding images 222, and/or perform other tasks related to the content of images 222.

Figure 4A:
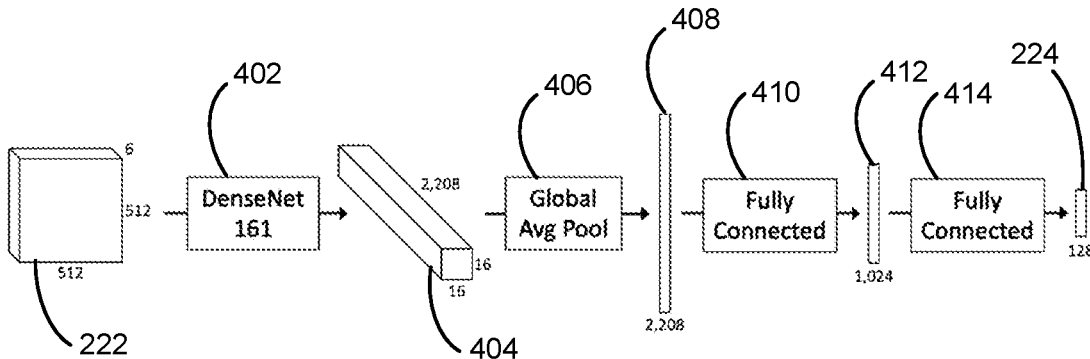
FIG. 4A illustrates an exemplar architecture for the machine learning model of FIG. 2, according to various embodiments.

FIG. 4A illustrates an exemplar architecture for machine learning model 200 of FIG. 2, according to various embodiments. As shown in FIG. 4A, input into the exemplar architecture includes an image 222. For example, image 222 could be 512 pixels by 512 pixels and include six imaging channels.

Image 222 is processed by a backbone 402 that includes a DenseNet 161 architecture. Backbone 402 includes a series of densely connected blocks that are separated by convolutional and pooling layers. The convolutional and pooling layers change the sizes of feature maps between one densely connected block and the next densely connected block. The output of backbone 402 includes a feature map 404 with dimensions of 16×16×2208.

Feature map 404 is inputted into a global average pooling layer 406 that generates a 1×2208 feature map 408 from feature map 404. Each value in feature map 408 is computed as the average of values in a corresponding 16×16 "slice" within feature map 404.

Feature map 408 is inputted into a fully connected layer 410. Output of fully connected layer 410 includes a 1×1024 feature map 412. Feature map 412 is then inputted into another fully connected layer 414 to produce a 1×128 feature map that is used as embedding 224 for the input image 222.

In one or more embodiments, image 222 corresponds to a portion of a larger image. During training of machine learning model 200, image 222 includes a crop of the larger image. For example, image 222 could include a 512×512 center crop and/or a randomly positioned crop of the larger image. Image 222 could also, or instead, include a randomly sized crop that is upsampled or downsampled to be 512× 512.

After training of machine learning model 200 is complete, an embedding of a larger image is generated as the aggregation of embeddings 224 of multiple non-overlapping portions of the larger image. For example, a larger image could be divided into four 512×512 quadrants. Each quadrant could be inputted as a separate image 222 into machine learning model 200 to obtain a corresponding embedding 224. The four embeddings 224 produced by machine learning model 200 from the four quadrants could then be averaged to produce an embedding for the larger image.

Figure 4B:
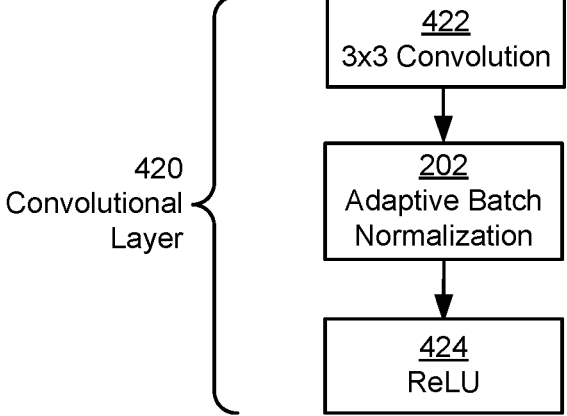
FIG. 4B illustrates an exemplar convolutional layer in the machine learning model of FIG. 2, according to various embodiments.

FIG. 4B illustrates an exemplar convolutional layer 420 in machine learning model 200 of FIG. 2, according to various embodiments. As shown in FIG. 4B, convolutional layer 420 includes a 3×3 convolution 422, followed by adaptive batch normalization 202, followed by a rectified linear unit (ReLU) 424 activation function.

Adaptive batch normalization 202 is used to normalize the output of 3×3 convolution 422 for a given batch of images 222 (e.g., a batch of images 222 that has been sampled from a plate and/or an experiment). For example, 3×3 convolution 422 could be used to compute multiple feature maps of the same dimensions from the batch of images. For each position (e.g., an element represented by a certain height, width, and/or depth) in the feature maps, adaptive batch normalization 202 could compute the mean and standard deviation of the values stored in the position within the feature maps. Adaptive batch normalization 202 could subtract the mean from each of the values and divide the result by the standard deviation to obtain a corresponding normalized value. In other words, adaptive batch normalization 202 normalizes the feature maps for the batch of images 222 so that the distribution of values in each element within the feature maps has a mean of 0 and a standard deviation of 1.

While adaptive batch normalization 202 is depicted within convolutional layer 420, it will be appreciated that adaptive batch normalization 202 can be used to normalize outputs of other components in machine learning model 200. For example, adaptive batch normalization 202 could be used to normalize the outputs of a fully connected layer and/or another type of neural network layer in machine learning model 200 before a corresponding activation function is applied to the outputs.

FIG. 5 sets forth a flow diagram of method steps for training a machine learning model to generate image embeddings for images captured across multiple experiments, according to various embodiments. Although the method steps are described in conjunction with the systems of FIGS. 1-2, persons skilled in the art will understand that any system configured to perform the method steps in any order falls within the scope of the present disclosure.

As shown, training engine 122 samples 502 a batch of images associated with an experiment. For example, training engine 122 could populate the batch with images of the same plate of cells and/or images captured during the same experiment.

Next, training engine 122 inputs 504 the batch of images into a machine learning model. For example, training engine 122 could input the batch of images into a deep learning model that includes one or more convolutional layers and/or one or more fully connected layers.

Training engine 122 computes 506 a set of statistics associated with a set of outputs generated by a layer of the machine learning model based on the batch of images. For example, training engine 122 could compute a mean and a standard deviation of a set of output values generated by each neuron in the layer from the batch of images. Training engine 122 also normalizes 508 the output based on the statistics. Continuing with the above example, training engine 122 could subtract the mean from the set of output values to produce a set of centered output values. Training engine 122 could then divide the centered output values by the standard deviation to produce a set of normalized output values. The normalized values could be distributed with a mean of 0 and a standard deviation of 1.

Training engine 122 also determines 510 whether adaptive batch normalization is to be performed on additional layers of the machine learning model. For example, training engine 122 could determine that adaptive batch normalization is to be performed on subsequent convolutional layers and/or fully connected layers in the machine learning model. When training engine 122 determines that adaptive batch normalization is to be performed on a subsequent layer, training engine 122 repeats operations 506-508 for outputs generated by the subsequent layer.

When training engine 122 determines that adaptive batch normalization is not to be performed on additional layers of the machine learning model, training engine 122 updates 512 parameters of the machine learning model based on one or more losses associated with predictions generated by the machine learning model from the batch of images and/or normalized outputs. For example, training engine 122 could compute a cross-entropy loss and/or another measure of error between predictions of classes outputted by the machine learning model for the batch of images and labels associated with the batch of images. Training engine 122 could use gradient descent and backpropagation to update parameters of the machine learning model in a way that reduces the loss(es).

Training engine 122 determines 514 whether training of the machine learning model is complete. For example, training engine 122 could determine that training is complete when one or more conditions are met. These condition (s) include (but are not limited to) convergence in the parameters of the machine learning model; the lowering of one or more losses to below a threshold; and/or a certain number of training steps, iterations, batches, and/or epochs. While training of the machine learning model is not complete, training engine 122 continues performing operations 502-512 using additional batches of images and/or corresponding losses. Training engine 122 ends the process of training the machine learning model once the condition(s) are met.

Figure 6:
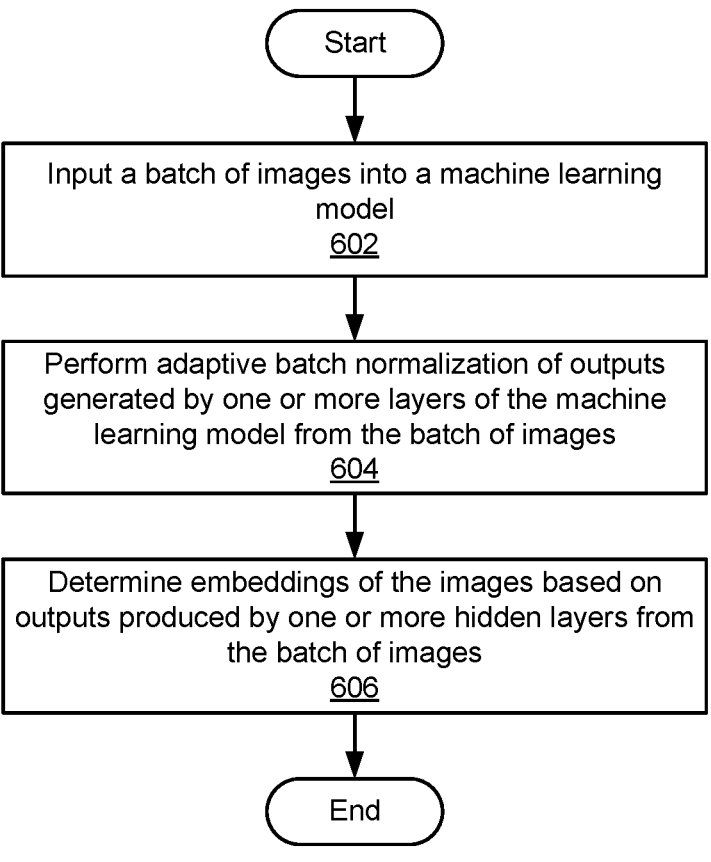
FIG. 6 sets forth a flow diagram of method steps for generating image embeddings for images captured across multiple experiments, according to various embodiments.

FIG. 6 sets forth a flow diagram of method steps for generating image embeddings for images captured across multiple experiments, according to various embodiments. Although the method steps are described in conjunction with the systems of FIGS. 1-2, persons skilled in the art will understand that any system configured to perform the method steps in any order falls within the scope of the present disclosure.

As shown, execution engine 124 inputs 602 a batch of images into a machine learning model. For example, execution engine 124 could input images of cells from the same plate and/or the same experiment into a deep learning model.

Next, execution engine 124 performs 604 adaptive batch normalization of outputs generated by one or more layers of the machine learning model from the batch of images. For example, execution engine 124 could compute a mean and standard deviation of output values generated by each neuron in a layer from the batch of images. Execution engine 124 could use the mean and standard deviation to normalize the output values before providing the normalized output values as input into the next layer of the machine learning model. Execution engine 124 could also use the same technique to normalize output values generated by neurons in subsequent layers of the machine learning model.

Execution engine 124 then generates 606 embeddings of the images based on outputs produced by one or more hidden layers from the batch of images. For example, execution engine 124 could obtain an embedding of each image as the normalized or non-normalized output generated by the last hidden layer from the image.

In sum, the disclosed techniques train and execute a deep learning model that generates embeddings of images. The image embeddings are generated for multiple batches of images, where each batch of images is captured under a different set of conditions. Objects depicted in the images can differ in appearance due to both the perturbations applied to the objects (e.g., different medical or biological treatments applied to cells) and the varying conditions under which different batches of images are captured.

To mitigate batch effects that interfere with the characterization of visual attributes that distinguish between perturbations applied to the objects, the deep learning model includes adaptive batch normalization layers that are executed after convolutional layers, fully connected layers, and/or other layers of neurons in the deep learning model. Each adaptive batch normalization layer computes the mean and standard deviation of a set of output values generated by each neuron in the previous layer from a given batch of images. Each adaptive batch normalization layer also standardizes the set of values using the computed mean and standard deviation, so that the set of output values is centered at 0 and has a standard deviation of 1. The adaptive batch normalization layer is used during training of the deep learning model and during subsequent execution of the trained deep learning model to generate embeddings for additional batches of images.

At least one technical advantage of the disclosed techniques relative to the prior art is that, with the disclosed techniques, image embeddings exhibit less noise resulting from batch effects. Accordingly, image embeddings generated using the disclosed techniques more accurately represent distinguishing visual attributes of objects or other content within images relative to image embeddings generated using conventional approaches that do not normalize for batch effects in image embeddings. These technical advantages provide one or more technological improvements over prior art approaches.

1. In some embodiments, a computer-implemented method for training a machine learning model to generate image embeddings for images captured during multiple experiments comprises inputting a first batch of images into a first machine learning model that includes a plurality of layers, wherein the first batch of images has been sampled from a first plurality of images generated via a first experiment; for at least one layer included in the plurality of layers, computing a first set of statistics associated with a first plurality of outputs generated by the at least one layer based on the first batch of images, and normalizing the first plurality of outputs based on the first set of statistics to generate a first plurality of normalized outputs; and updating a plurality of parameters for each layer included in the plurality of layers based on a first set of predictions generated by the first machine learning model from the first batch of images and the first plurality of normalized outputs.

2. The computer-implemented method of clause 1, further comprising inputting a second batch of images into the first machine learning model, wherein the second batch of images is sampled from a second plurality of images generated via a second experiment; and updating the plurality of parameters for each layer included in the plurality of layers based on a second set of predictions generated by the first machine learning model from the second batch of images and a set of labels associated with the second batch of images.

3. The computer-implemented method of any of clauses 1-2, wherein the set of labels corresponds to a set of cell perturbations that occurred during the first experiment and the second experiment.

4. The computer-implemented method of any of clauses 1-3, further comprising inputting a second batch of images into the first machine learning model, wherein the second batch of images has been generated via a second experiment; and generating a first plurality of embeddings for the second batch of images based on a third plurality of outputs generated by a hidden layer included in the plurality of layers.

5. The computer-implemented method of any of clauses 1-4, further comprising computing a first set of metrics associated with a first plurality of embeddings generated by the first machine learning model and a second set of metrics associated with a second plurality of embeddings generated by a second machine learning model; selecting an embedding model from the first machine learning model and the second machine learning model based on a comparison of the first set of metrics and the second set of metrics; and applying the embedding model to a third plurality of images to generate a third plurality of embeddings.

6. The computer-implemented method of any of clauses 1-5, further comprising generating a first distribution of similarities between a first plurality of embeddings generated by the first machine learning model from a second batch of images and a second plurality of embeddings generated by the first machine learning model from a third batch of images, wherein the first distribution of similarities is generated based on pairs of embeddings that are associated with a common class and different experiments; generating a second distribution of similarities between the first plurality of embeddings and a second plurality of embeddings, wherein the second distribution of similarities is generated based on pairs of embeddings that are associated with different classes and different experiments; and computing a perturbation consistency based on the first distribution of similarities and the second distribution of similarities.

7. The computer-implemented method of any of clauses 1-6, wherein normalizing the first plurality of outputs comprises computing a mean of the first plurality of outputs and a standard deviation of the first plurality of outputs; subtracting the mean from an output in the first plurality of outputs to produce a centered output; and dividing the centered output by the standard deviation to produce a normalized output.

8. The computer-implemented method of any of clauses 1-7, further comprising cropping the first batch of images prior to inputting the first batch of images into the first machine learning model.

9. The computer-implemented method of any of clauses 1-8, wherein the plurality of layers includes a convolutional layer and a fully connected layer.

10. The computer-implemented method of any of clauses 1-9, wherein the first batch of images is generated from a plate of cells associated with the first experiment.

11. In some embodiments, one or more non-transitory computer readable media storing instructions that, when executed by one or more processors, cause the one or more processors to perform the steps of inputting a first batch of images into a first trained machine learning model that includes a plurality of layers, wherein the first batch of images has been sampled from a first plurality of images generated via a first experiment; for at least one layer included in the plurality of layers, computing a first set of statistics associated with a first plurality of outputs generated by the at least one layer based on the first batch of images, and normalizing the first plurality of outputs based on the first set of statistics to generate a first plurality of normalized outputs; and generating a first plurality of embeddings for the first batch of images based on the first plurality of normalized outputs.

12. The one or more non-transitory computer readable media of clause 11, wherein the instructions further cause the one or more processors to perform the steps of inputting a second batch of images into the first machine learning model, wherein the second batch of images is sampled from a second plurality of images generated via a second experiment; and updating a plurality of parameters for each layer included in the plurality of layers based on one or more losses computed from a set of predictions generated by the first machine learning model from the second batch of images and a set of labels associated with the second batch of images.

13. The one or more non-transitory computer readable media of any of clauses 11-12, wherein the one or more losses comprise a cross entropy loss.

14. The one or more non-transitory computer readable media of any of clauses 11-13, wherein the set of labels corresponds to a set of cell perturbations that occurred during the first experiment and the second experiment.

15. The one or more non-transitory computer readable media of any of clauses 11-14, wherein the first set of predictions comprises a set of probabilities for a set of classes associated with the first plurality of images.

16. The one or more non-transitory computer readable media of any of clauses 11-15, wherein the set of predictions is outputted by a layer that is immediately subsequent to a hidden layer included in the trained machine learning model.

17. The one or more non-transitory computer readable media of any of clauses 11-16, wherein the instructions further cause the one or more processors to perform the steps of computing a first set of metrics associated with the first plurality of embeddings generated by the first machine learning model and a second set of metrics associated with a second plurality of embeddings generated by a second machine learning model; selecting an embedding model from the first machine learning model and the second machine learning model based on a comparison of the first set of metrics and the second set of metrics; and applying the embedding model to a third plurality of images to generate a third plurality of embeddings.

18. The one or more non-transitory computer readable media of any of clauses 11-17, wherein the first set of metrics and the second set of metrics comprises at least one of a perturbation consistency, a perturbation detection metric, and a hit detection metric.

19. The one or more non-transitory computer readable media of any of clauses 11-18, wherein normalizing the first plurality of outputs comprises computing a mean of the first plurality of outputs and a standard deviation of the first plurality of outputs; subtracting the mean from an output in the first plurality of outputs to produce a centered output; and dividing the centered output by the standard deviation to produce a normalized output.

20. In some embodiments, a system comprises a memory that stores instructions, and a processor that is coupled to the memory and, when executing the instructions, is configured to input a first batch of images into a first machine learning model that includes a plurality of layers, wherein the first batch of images has been sampled from a first plurality of images generated via a first experiment; for at least one layer included in the plurality of layers, compute a first set of statistics associated with a first plurality of outputs generated by the at least one layer based on the first batch of images and normalize the first plurality of outputs based on the first set of statistics to generate a first plurality of normalized outputs; and update a plurality of parameters for each layer included in the plurality of layers based on a first set of predictions generated by the first machine learning model from the first batch of images and the first plurality of normalized outputs.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method comprising:
   training a machine learning model to generate a trained machine learning model by:
   inputting a first batch of images into a first machine learning model that includes a plurality of layers having a set of parameters, wherein the first batch of images has been sampled from a first plurality of images generated via a first perturbation experiment comprising a first set of experimental conditions;
   for at least one layer included in the plurality of layers:
   computing, by a batch normalization layer of the plurality of layers, a first set of batch normalization statistics to account for the first set of experimental conditions associated with a first plurality of outputs generated by the at least one layer based on the first batch of images of the first perturbation experiment; and
   normalizing the first plurality of outputs to account for a first batch effect in the first batch of images from the first perturbation experiment based on the first set of batch normalization statistics to generate a first plurality of batch normalized outputs;
   generating an updated set of parameters by updating the set of parameters of the plurality of layers based on a first set of predictions generated by the first machine learning model from the first batch of images of the first perturbation experiment and from the first plurality of batch normalized outputs;

inputting a second batch of images into the first machine learning model, wherein the second batch of images is sampled from a second plurality of images generated via a second perturbation experiment comprising a second set of experimental conditions;

for the at least one layer:

computing a second set of batch normalization statistics to account for the second set of experimental conditions associated with a second plurality of outputs generated by the at least one layer based on the second batch of images of the second perturbation experiment; and normalizing the second plurality of outputs to account for a second batch effect in the second batch of images from the second perturbation experiment based on the second set of batch normalization statistics to generate a second plurality of batch normalized outputs;

updating the updated set of parameters in the plurality of layers based on a second set of predictions generated by the first machine learning model from the second batch of images of the second perturbation experiment and from the second plurality of batch normalized outputs; and generating, using the trained machine learning model, a batch normalized embedding from an image corresponding to a new perturbation experiment.

2. The computer-implemented method of claim 1, further comprising:

generating, by an input layer of the plurality of layers of the first machine learning model, an initial set of output values based on image data associated with the first batch of images;

generating, by a plurality of hidden layers of the plurality of layers of the first machine learning model, a plurality of hidden layer outputs from the initial set of output values; and selecting the at least one layer for batch normalization from the input layer or the plurality of hidden layers.

3. The computer-implemented method of claim 1, further comprising:

updating the updated set of parameters based on a set of labels associated with the second batch of images, wherein the set of labels corresponds to a set of cell perturbations that occurred during the first perturbation experiment and the second perturbation experiment.

4. The computer-implemented method of claim 1, further comprising:

generating a first plurality of embeddings for the second batch of images based on a third plurality of outputs generated by a hidden layer included in the plurality of layers.

5. The computer-implemented method of claim 1, further comprising:

computing a first set of metrics associated with a first plurality of embeddings generated by the first machine learning model and a second set of metrics associated with a second plurality of embeddings generated by a second machine learning model; and selecting the trained machine learning model from the first machine learning model and the second machine learning model based on a comparison of the first set of metrics and the second set of metrics.

6. The computer-implemented method of claim 1, further comprising:

generating a first distribution of similarities between a first plurality of embeddings generated by the first machine learning model from the second batch of images and a second plurality of embeddings generated by the first machine learning model from a third batch of images, wherein the first distribution of similarities is generated based on pairs of embeddings that are associated with a common class and different experiments;

generating a second distribution of similarities between the first plurality of embeddings and a second plurality of embeddings, wherein the second distribution of similarities is generated based on pairs of embeddings that are associated with different classes and different experiments; and computing a perturbation consistency based on the first distribution of similarities and the second distribution of similarities.

7. The computer-implemented method of claim 1, wherein normalizing the first plurality of outputs comprises:

computing a mean of the first plurality of outputs and a standard deviation of the first plurality of outputs;

subtracting the mean from an output in the first plurality of outputs to produce a centered output; and dividing the centered output by the standard deviation to produce a normalized output.

8. The computer-implemented method of claim 1, further comprising cropping the first batch of images prior to inputting the first batch of images into the first machine learning model.

9. The computer-implemented method of claim 1, wherein the plurality of layers includes a convolutional layer and a fully connected layer.

10. The computer-implemented method of claim 1, wherein the first batch of images is generated from a plate of cells associated with the first perturbation experiment and the first set of experimental conditions corresponds to the plate of cells.

11. One or more non-transitory computer readable media storing instructions that, when executed by one or more processors via a connection with an interconnect bus, cause the one or more processors to perform steps of:

training a machine learning model to generate a trained machine learning model by:

inputting a first batch of images into a first machine learning model that includes a plurality of layers having a set of parameters, wherein the first batch of images has been sampled from a first plurality of images generated via a first perturbation experiment comprising a first set of experimental conditions;

for at least one layer included in the plurality of layers:

computing, by a batch normalization layer of the plurality of layers, a first set of batch normalization statistics to account for a first batch effect in the first batch of images from the first perturbation experiment associated with a first plurality of outputs generated by the at least one layer based on the first batch of images of the first perturbation experiment; and normalizing the first plurality of outputs to account for a first batch effect in the first batch of images from the first perturbation experiment based on the first set of batch normalization statistics to generate a first plurality of batch normalized outputs;

generating an updated set of parameters by updating the set of parameters of the plurality of layers based on a first set of predictions generated by the first machine learning model from the first batch of images of the first perturbation experiment and from the first plurality of batch normalized outputs;

generating a first plurality of embeddings for the first batch of images based on the first plurality of batch normalized outputs;

inputting a second batch of images into the first machine learning model, wherein the second batch of images is sampled from a second plurality of images generated via a second perturbation experiment comprising a second set of experimental conditions;

for the at least one layer:

computing a second set of batch normalization statistics to account for the second set of experimental conditions associated with a second plurality of outputs generated by the at least one layer based on the second batch of images of the second perturbation experiment; and normalizing the second plurality of outputs to account for a second batch effect in the second batch of images from the second perturbation experiment based on the second set of batch normalization statistics to generate a second plurality of batch normalized outputs;

updating the updated set of parameters in the plurality of layers based on a second set of predictions generated by the first machine learning model from the second batch of images of the second perturbation experiment and from the second plurality of batch normalized outputs; and generating, using the trained machine learning model, a batch normalized embedding from an image corresponding to a new perturbation experiment.

12. The one or more non-transitory computer readable media of claim 11, wherein the instructions further cause the one or more processors to perform the steps of:

generating, by an input layer of the plurality of layers of the first machine learning model, an initial set of output values based on image data associated with the first batch of images;

generating, by a plurality of hidden layers of the plurality of layers of the first machine learning model, a plurality of hidden layer outputs from the initial set of output values; and selecting the at least one layer for batch normalization from the input layer or the plurality of hidden layers.

13. The one or more non-transitory computer readable media of claim 11, wherein the instructions further cause the one or more processors to perform the steps of:

updating the updated set of parameters for each layer included in the plurality of layers based on one or more losses computed from a set of predictions generated by the first machine learning model from the second batch of images and a set of labels associated with the second batch of images, wherein the one or more losses comprises a cross entropy loss.

14. The one or more non-transitory computer readable media of claim 13, wherein the set of labels corresponds to a set of cell perturbations that occurred during the first perturbation experiment and the second perturbation experiment.

15. The one or more non-transitory computer readable media of claim 13, wherein the first set of predictions comprises a set of probabilities for a set of classes associated with the first plurality of images.

16. The one or more non-transitory computer readable media of claim 13, wherein the set of predictions is outputted by a layer that is immediately subsequent to a hidden layer included in the first machine learning model.

17. The one or more non-transitory computer readable media of claim 11, wherein the instructions further cause the one or more processors to perform the steps of:

computing a first set of metrics associated with the first plurality of embeddings generated by the first machine learning model and a second set of metrics associated with a second plurality of embeddings generated by a second machine learning model; and selecting the trained machine learning model from the first machine learning model and the second machine learning model based on a comparison of the first set of metrics and the second set of metrics.

18. The one or more non-transitory computer readable media of claim 17, wherein the first set of metrics and the second set of metrics comprises at least one of a perturbation consistency, a perturbation detection metric, and a hit detection metric.

19. The one or more non-transitory computer readable media of claim 11, wherein normalizing the first plurality of outputs comprises:

computing a mean of the first plurality of outputs and a standard deviation of the first plurality of outputs;

subtracting the mean from an output in the first plurality of outputs to produce a centered output; and dividing the centered output by the standard deviation to produce a normalized output.

20. A system, comprising:

a memory that stores instructions, and a processor that is coupled to the memory by an interconnect bus and, when executing the instructions, is configured to:

train a machine learning model to generate a trained machine learning model by:

inputting a first batch of images into a first machine learning model that includes a plurality of layers having a set of parameters, wherein the first batch of images has been sampled from a first plurality of images generated via a first perturbation experiment comprising a first set of experimental conditions;

for at least one layer included in the plurality of layers:

computing, by a batch normalization layer of the plurality of layers, a first set of batch normalization statistics to account for the first set of experimental conditions associated with a first plurality of outputs generated by the at least one layer based on the first batch of images of the first perturbation experiment; and normalizing the first plurality of outputs to account for a first batch effect in the first batch of images from the first perturbation experiment based on the first set of batch normalization statistics to generate a first plurality of batch normalized outputs;

generating an updated set of parameters by updating the set of parameters of the plurality of layers based on a first set of predictions generated by the first machine learning model from the first batch of images of the first perturbation experiment and from the first plurality of batch normalized outputs;

inputting a second batch of images into the first machine learning model, wherein the second batch of images is sampled from a second plurality of images generated via a second perturbation experiment comprising a second set of experimental conditions;

for the at least one layer:

computing a second set of batch normalization statistics to account for the second set of experimental conditions associated with a second plurality of outputs generated by the at least one layer based on the second batch of images of the second perturbation experiment; and normalizing the second plurality of outputs to account for a second batch effect in the second batch of images from the second perturbation experiment based on the second set of batch normalization statistics to generate a second plurality of batch normalized outputs;

updating the updated set of parameters in the plurality of layers based on a second set of predictions generated by the first machine learning model from the second batch of images of the second perturbation experiment and from the second plurality of batch normalized outputs; and generating, using the trained machine learning model, a batch normalized embedding from an image corresponding to a new perturbation experiment.

\*    \*    \*    \*    \*